United States Patent [19]
Mainord

[11] 3,859,385
[45] Jan. 7, 1975

[54] EMULSIFIABLE POLYETHYLENE COMPOSITIONS PREPARED FROM THERMALLY DEGRADED LOW MOLECULAR WEIGHT POLYETHYLENE AND CROTONIC ACID

[75] Inventor: Kenneth R. Mainord, Longview, Tex.

[73] Assignee: Eastman Kodak Company, Rochester, N.Y.

[22] Filed: July 20, 1973

[21] Appl. No.: 381,132

[52] U.S. Cl........ 260/878 R, 117/139.4, 117/139.5, 117/155, 117/161, 161/216, 161/250, 260/28.5 A, 260/29.6 R, 260/33.6 UA, 260/94.9 GC, 260/94.9 GD
[51] Int. Cl. ............................................ C08f 27/00
[58] Field of Search...... 260/28.5 A, 878 R, 88.1 R, 260/94.9 GC, 94.9 GD

[56] References Cited
UNITED STATES PATENTS

| | | | |
|---|---|---|---|
| 2,766,214 | 10/1956 | Erchak et al. | 260/94.9 GC |
| 2,928,816 | 3/1960 | Chapman et al. | 260/94.9 GC |
| 3,201,381 | 8/1965 | Hagemeyer et al. | 260/94.9 GC |
| 3,236,917 | 2/1966 | Natta et al. | 260/878 R |
| 3,687,905 | 8/1972 | Dorer | 260/94.9 GC |

Primary Examiner—Harry Wong, Jr.

[57] ABSTRACT

Emulsifiable low molecular weight modified polyethylene compositions are disclosed as well as processes for their preparation. The modified polyethylenes are prepared by reacting low molecular weight polyethylene with crotonic acid in the presence of a peroxide catalyst to produce an emulsifiable modified polyethylene wax. These emulsifiable polyethylene waxes can be used to form aqueous emulsions for use as textile treating agents or floor polishes.

8 Claims, No Drawings

EMULSIFIABLE POLYETHYLENE COMPOSITIONS PREPARED FROM THERMALLY DEGRADED LOW MOLECULAR WEIGHT POLYETHYLENE AND CROTONIC ACID

This invention relates to modified polyethylene polymers having improved physical properties and the process for preparation thereof. One of the aspects of this invention concerns novel emulsifiable low molecular weight polyethylene compositions. Another aspect of this invention concerns novel products formed by reacting low-viscosity polyethylene and crotonic acid in the presence of a peroxide catalyst.

It is known in the art to prepare emulsifiable polyethylene waxes. One such well known method for making low molecular weight polyethylene emulsifiable is to oxidize the polyethylene to acid numbers of from about 15 to 50 with air or oxygen. The oxidation introduces a variety of polar oxygenated groups, in particular, carboxyl groups. These carboxyl groups when present in high enough proportion make the polyethylene wax emulsifiable. Such waxes have many and diverse uses, and water based emulsions of these waxes are widely used in floor polishes. However, emulsifiable polyethylene waxes made by oxidation generally have two major disadvantages. They normally have poor viscosity stability when held in the melt for long periods of time and they normally have poor amine color. Amine color is defined as the yellow color which develops when an emulsifiable polyethylene wax is reacted with a base such as morpholine, 2-amino-2-methylpropanol, or potassium hydroxide in the melt at 125°C. Because such bases are widely used in formulating anionic emulsions of polyethylene waxes, the color developed during addition of amine or base to the molten wax is carried over into the emulsions. For emulsions used in floor polishes any color is undesirable and the emulsion should be as light colored as possible. Therefore, it is apparent that it would be an advance in the art to provide emulsifiable polyethylene waxes which exhibit little change in viscosity when held in the molten state for long periods of time and which have low amine color and form light colored emulsions.

Accordingly, it is one of the objects of the present invention to provide new and improved low viscosiy polyethylene compositions having improved physical properties.

A further object of the invention is to provide an emulsifiable polyethylene composition.

Still another object of the invention is to form emulsions of low molecular weight polyethylene compositions having high clarity and gloss.

Further objects and advantages of this invention will be apparent to those skilled in the art from the accompanying disclosure and claims.

In accordance with one aspect of this invention, it has been found that thermally degraded polyethylene can be modified to produce polymers having improved physical and chemical properties by reacting the thermally degraded polyethylene with crotonic acid in the presence of an organic peroxide catalyst. These modified polymeric materials are low molecular weight and emulsifiable in aqueous mediums. The thermally degraded crystallizable polyethylenes useful in the present invention are prepared from crystalline polyethylenes prepared by conventional polymerization processes for preparing low, medium and high density polyethylene. These low, medium and high density polyethylene polymers include commercially available low, medium and high density polyethylene. The low and medium density polyethylenes are prepared at elevated temperatures and elevated pressures, i.e., greater than 5,000 psi using free radical initiators. Suitable initiators include, i.e., di-t-butyl peroxide, tert butyl peracetate, diisopropyl peroxydicarbonate, acetyl peroxide, benzoyl peroxide, lauroyl peroxide, caprylyl peroxide, t-butyl peroxyisobutyrate, hydroxyheptyl peroxide, azobis (isobutyronitrile), 2,5-dimethyl-2,5-di-t-butylperoxyhexane, and t-butyl peroxypivalate. High density polyethylene is readily prepared at low pressures, i.e., less than 1,000 psi with supported metal oxide catalysts such as, for example, chromic oxide supported on silica/alumina, or with typical coordination catalysts such as $R_3Al/TiCl_4$ or $R_3AlCl/TiCl_3$. For example, one such suitable polymer is the highly crystallizable polyethylene having a density in the range of about 0.91 to 0.98 measured in a density gradient tube using a thermally conditioned sample (ASTM D-15-05-63T). Thermal degradation of these polyethylene polymers apparently takes place at the points of chain branching of the polymer molecule. The degree of degradation can be controlled by reaction time and temperature to give a thermally degraded low molecular weight crystallizable polyethylene material having a melt viscosity range of from 225–15,000 centipoise at 125°C. (determined on a Brookfield viscosimeter) and an inherent viscosity of about 0.05 to 0.5. [Schulken & Sparks, *J. Polymer Sci.* 26, 227, (1957)]. By carefully controlling the time, temperature and agitation, a thermally degraded polyethylene of relatively narrower molecular weight range than the unmodified high molecular weight polyethylene is obtained. The degradation is carried out at a temperature from 290° to about 425°C. These thermally degraded products are not emulsifiable; however, on reaction with the crotonic acid to an acid number of greater than 6, preferably 7–50, most preferably 20–40, the thermally degraded polyethylene becomes emulsifiable.

The thermally degraded polyethylene can be reacted in the melt phase with crotonic acid and peroxide in a well stirred vessel. The temperature of reaction can range from 120°C. (slightly above the melting point of the polyethylene) to 300°C., preferably 150°C. to 180°C. However, at temperatures above 200°C., a pressure vessel is necessary to keep the crotonic acid from being too volatile. The peroxide can be added to the stirred mixture all at once or in small portions. The reaction time and reaction temperature are chosen such that the peroxide will completely decompose within a reasonable time period (0.5 to 5.0 hours). For example, with ditertiary butyl peroxide reaction would be essentially complete at 170°C. in one hour since its half-life is approximately eight minutes at 170°C. Temperatures so high that the peroxide decomposes before adequate mixing and reaction of the polyethylene-crotonic acid mixture can occur should be avoided.

The amount of grafting is proportional to both the concentration of crotonic acid and peroxide used and increases with increasing concentrations of both. The grafting reaction is characterized by a viscosity increase. For example, when polyethylene having a melt viscosity of 230 centipoise at 125°C. and a density of 0.918 is grafted with crotonic acid to an acid number of approximately 35, the viscosity of the product is about 1,000 centipoise at 125°C. compared to 230 centipoise for the polyethylene starting material. The properties of the emulsifiable wax can be varied by changing the feed polyethylene. For example, a low density emulsifiable wax can be made by reacting a degraded polyethylene having a viscosity at 125°C. of about 2,000 centipoise and a density of 0.925. A higher density emulsifiable wax can be produced by reacting a degraded polyethylene having a viscosity at 125°C. of about 500 centipoise and a density of 0.947.

After all the peroxide has reacted, excess crotonic acid can be separated from the reaction mixture by purging the reaction mixture with an inert gas such as nitrogen while the melt temperature is between 180° to 200°C. After the unreacted crotonic acid has been removed, the modified polyethylene can be further purified by vacuum stripping or solvent extraction.

The emulsifiable polyethylene waxes of the present invention have unique properties when compared to the prior art emulsifiable waxes prepared by oxidizing polyethylene. More particularly, when low molecular weight polyethylene is reacted with crotonic acid and a peroxide catalyst such as ditertiary butyl peroxide at temperatures from 120° to 200°C., grafting of the crotonic acid onto the polyethylene occurs in a sufficient amount to make the polyethylene emulsifiable. The emulsifiable polyethylenes so produced are characterized by excellent viscosity stability and light colored emulsions in contrast to emulsifiable polyethylenes produced by oxidation of low molecular weight polyethylene. For example, a commercial emulsifiable oxidized polyethylene having a viscosity of 940 centipoise at 125°C., a density of 0.942, a ring and ball softening point of 106°C. and an acid number of 17 has a typical amine color of 9 and when held molten at 125°C. for 48 hours will increase in viscosity until it is completely gelled or crosslinked. In contrast, a graft copolymer of a low molecular weight degraded polyethylene and crotonic acid having a viscosity of 1,000 centipoise at 125°C., a density of 0.926, a ring and ball softening point of 104°C., and an acid number of 35 has an amine color of 4-5 and will increase in viscosity only slightly when held at 125°C. for 48 hours.

Another aspect of the invention is to react a low molecular weight polyethylene having an inherent viscosity of from about 0.1 to about 0.5 with crotonic acid at temperatures below 200°C. in the same manner as noted hereinabove for reacting thermally degraded polyethylene. For example, polyethylene having an inherent viscosity of 0.1 to 0.5 is reacted with crotonic acid to prepare a modified polyethylene having an inherent viscosity of 0.1 to 0.5 and an acid number of at least 6. These low molecular weight polyethylenes having an inherent viscosity of from 0.1 to about 0.5 are also prepared by conventional processes. Moreover, the commercially available low molecular weight polyethylenes can be used in the present invention for preparing the modified polyethylene.

In the present application the properties determined on polyethylenes and modified polyethylenes were determined by the following procedures:

| | |
|---|---|
| Density | ASTM D-1505-68 |
| Ring and Ball Softening Point | ASTM E-28-58 |
| Penetration Hardness | ASTM D-5-52 |
| Acid Number | ASTM D-1386-59 |
| Gardner Color | Hellige Color Comparator With Gardner Varnish Scales No. 620-C40 |
| Viscosity | Brookfield Viscosimeter |
| Amine Color | Texas Eastman Company Plastics Laboratory Procedure 27-131 using Hellige Color Comparator With Gardner Varnish Scales No. 620C-40 as follows: | a. Weigh 40 ± 0.2 gm. of wax sample into a porcelain casserol and record exact weight of wax.
b. Using a 10-ml. graduated cylinder add 8 ± 0.2 ml. of oleic acid to the casserol and heat intermittently on hot plate with gentle stirring until the wax is melted.
c. Continue to heat the oleic acid wax mixture to 120°–125°C. Do not allow the temperature to rise above 125°C. during the mixing step. Record the ml. of oleic acid added.
d. Using a 10 ml. graduated cylinder, warmed on outside with hot tap water, add 7 ± 0.2 ml. of 2-amine-2-methyl-1-propanol to casserol, stir and hold at 120°–125°C. for 3 ± ½ minute. Record the following:
  1. The ml. of 2-amine-2-methyl-1-propanol added.
  2. Temperature prior to 2-amine-2-methyl-1-propanol addition.
  3. Clock time when 2-amine-2-methyl-1-propanol is added.
  4. Temperature range during mixing step.
e. Heat this mixture to 130° ± 1°C. and pour into sample tube which has been preheated in 125°C. oil bath for at least 5 minutes.
f. Fill sample tube two-thirds full and read immediately on Hellige Color Comparator with Gardner Color Scale. Record clock time of reading and Gardner color value as amine color.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Two hundred grams of a degraded polyethylene having a density of about 0.918, a ring and ball softening point of about 106°C., and a viscosity at 125°C. of about 250 centipoise and 200 grams of benzene were brought to reflux temperature of 85°C. in a stirred glass flask. Twenty grams of acrylic acid were added as soon as the polyethylene was disslved and then 12 grams of Lupersol 11 (t-butylperoxypivalate) were added dropwise over a period of one hour. Even before peroxide addition was begun, the solution became very cloudy indicating some thermal homopolymerization of the acrylic acid. As peroxide was added the solution progressively grew whiter and more opaque. After reaction, the solution was cooled to room temperature and the polymer was precipitated with 1,000 milliliters of methanol. After filtering and washing with additional methanol, the white powder obtained was dried under vacuum at about 80°C. overnight. The product was a white powder which was opaque in the melt, indicating homopolymer of acrylic acid grafted onto the polyethylene. The acid number of the product was 28 and it was not emulsifiable.

Acrylic acid having a chemical structure similar to crotonic acid is not a suitable monomer for grafting because of its high reactivity to homopolymerization. Thus, any grafting that does occur to the polyethylene backbone is grafting of homopolymer units rather than the desired monomeric units.

EXAMPLE 2

Four hundred grams of a degraded polyethylene having a density of about 0.918, a ring and ball softening point of about 106°C., and a viscosity at 125°C. of about 250 centipoise were melted under nitrogen and brought to 170°C. in a stirred glass flask. Forty grams of 2-furanacrylic acid were added and dispersed in the polyethylene. The mixture turned fairly brown colored. Over a period of 30 minutes, 12 grams of ditertiary butyl peroxide were added to the reaction mixture and reaction was continued at 175°–180°C. for 1 hour. Some crosslinking occurred as evidenced by a thickening of the reaction medium during reaction. The crude product was dissolved in xylene and precipitated with methanol. The product was a brown powder and had an acid number of 17.7.

Grafting of 2-furanacrylic acid having a chemical structure similar to crotonic acid gives an unacceptable brown product with a low acid number.

EXAMPLE 3

Two hundred fifty grams of a degraded polyethylene having a density of about 0.927, a ring and ball softening point of about 111°C., and a viscosity at 125°C. of about 2,000 centipoise were melted under nitrogen and brought to 190°C. in a glass stirred flask. Twenty-five grams of cinnamic acid were added and dispersed in the polyethylene. Five grams of ditertiary butyl peroxide dissolved in 50 milliliters of n-tetradecane were added dropwise over a period of 30 minutes. Reaction was continued 30 more minutes and the product was dissolved in xylene and precipitated with methanol to remove ungrafted monomer and peroxide decomposition products. After drying, the product was a white powder with an acid number of 8.8 and a viscosity of 9,600 centipoise at 125°C. In the melt the product was opaque. The low acid number of the wax prevented it from being emulsifiable.

EXAMPLE 4

Two hundred grams of a degraded polyethylene having a density of about 0.927, a ring and ball softening point of about 111°C., and a viscosity at 125°C. of about 2,000 centipoise were melted under nitrogen in a stirred glass flask and brought to 190°C. Forty grams of 2-nonenoic acid were added all at once and then 4 grams of ditertiary butyl peroxide dissolved in 20 milliliters of n-tetradecane were added dropwise over a period of 30 minutes. Reaction was continued for 15 minutes and the mixture was worked up by dissolving in xylene and precipitating with methanol. The product was a white powder with an acid number of 11.0 and a viscosity of 3,000 centipoise at 125°C. In the melt, the product was a clear yellow with a Gardner color of 3. The product was not emulsifiable.

Further experiments showed that crotonic acid is the most suitable monomer for grafting. Graft copolymers of low molecular weight polyethylene and crotonic acid form good light colored emulsions and are exceptionally viscosity stable when held molten at 125°C. The amine color of these copolymers is also lower than emulsifiable waxes made by oxidation of polyethylene. The following examples illustrate this.

EXAMPLE 5

Eight hundred grams of a degraded polyethylene having a density of about 0.918, a ring and ball softening point of about 106°C., and a viscosity at 125°C. of about 250 centipoise were melted under nitrogen in a stirred glass reaction flask. The polyethylene was raised to about 170°C. and 80 grams of crotonic acid were added and allowed to mix well. After adjusting the temperature to 170°–175°C., 24 grams of ditertiary butyl peroxide were added dropwise over a period of 30 minutes. Reaction was continued for 30 minutes. Unreacted crotonic acid and peroxide decomposition products were removed by raising the temperature of the crude wax to 180°–190°C. and sweeping with nitrogen for one hour. The product obtained had the following properties.

The graft copolymer had a Brookfield viscosity at 125°C. of 1,080 centipoise, a Gardner color in the melt of 3, a density of 0.926 and an acid number of 37.4. The wax was exceptionally viscosity stable while being held molten at 125°C. After 6 days the viscosity of the wax had increased to only 1,400 centipoise. The product formed an excellent anionic emulsion with a percent transmittance (one percent solids) of 80. The amine color of the wax was a Gardner 4+.

EXAMPLE 6

The procedure outlined in Example 5 was repeated except that a higher density degraded polyethylene having a density of about 0.947, a ring and ball softening point of about 125°C., and a viscosity at 150°C. of about 500 centipoise, was used in place of the polyethylene used in Example 5. The resulting product had an acid number of 34, a Brookfield viscosity of 4,400 centipoise at 150°C., a density of 0.95, a ring and ball softening point of 120°C., and a penetration hardness of 0.1 mm$^{-1}$. It had a melt color of 3 and an amine color of 5. The sample could be emulsified using a direct pressure nonionic technique.

EXAMPLE 7

The procedure given in Example 5 was followed except that a degraded polyethylene having a density of about 0.937, a ring and ball softening point of about 112°C., and a viscosity at 125°C. of about 450 centipoise was used in place of the polyethylene used in Example 5. The graft copolymer wax prepared had an acid number of 38.0, a viscosity of 5,500 centipoise at 125°C., a density of 0.94, a ring and ball softening point of 108°C., and a penetration hardness of 1 mm$^{-1}$. It had a melt color of 4 and an amine color of 6. The product was emulsifiable by standard anionic wax to water methods.

The advantages of the graft copolymer produced by the process described in Example 5 can be shown by comparison of the following data. Below are summarized viscosity stability data, melt color stability data, and amine color data on a typical degraded polyethylene/crotonic acid graft copolymer and these are compared to a typical oxidized polyethylene wax.

Amine Color

| Wax Sample | Initial Color, Gardner | Amine Color |
| --- | --- | --- |
| 1 | 1 | 9 |
| 2 | 3 | 4 |

Color Stability
Increase in Color Observed When Wax is Held Molten at 125°C.

| Wax Sample | Gardner Melt Color, Days at 125°C. | | | |
| --- | --- | --- | --- | --- |
| | 0 | 1 | 2 | 3 |
| 1 | 1 | 6 | 8 | 10 |
| 2 | 2 | 3 | 3+ | 4 |

Viscosity Stability
Increase in Viscosity of the Wax While Held at 125°C.

| Wax Sample | Brookfield Viscosity (cp), Days at 125°C. | | | |
| --- | --- | --- | --- | --- |
| | 0 | 1 | 2 | 3 |
| 1 | 940 | 3,080 | Gelled | Gelled |
| 2 | 1,000 | 1,000 | 1,020 | 1,080 |

Wax Sample 1 - An emulsifiable oxidized polyethylene wax with a Brookfield viscosity at 125°C. of 940 centipoise, a density of 0.942, a ring and ball softening point of 106°C., a penetration hardness of 2.0, and an acid number of 17.
Wax Sample 2 - Degraded polyethylene/crotonic acid graft polymer with a Brookfield viscosity of 1000 centipoise, a density of 0.926, a ring and ball softening point of 104°C. a penetration hardness of 2.5, and an acid number of 35.

Although emulsifiable polyethylene and polypropylene waxes can be made by grafting with maleic anhydride, such waxes do not have the low amine color and excellent viscosity stability characteristic of the polyethylene/crotonic acid graft copolymers.

For example, when low molecular weight polypropylene is reacted in the melt with maleic anhydride and a peroxide catalyst, the maleated wax is highly colored having a Gardner color in the melt of about 9 to 13. The colors of the polyethylene/crotonic acid graft copolymers and polypropylene/crotonic acid copolymers are much lower with Gardner colors in the melt from 3 to 5 and from 2 to 3, respectively.

EXAMPLE 8

Eight hundred grams of a degraded polyethylene having a density of about 0.918, a ring and ball softening point of about 106°C., and a viscosity at 125°C. of about 250 centipoise were melted under nitrogen in a stirred glass reaction flask. The polyethylene was raised to about 170°C. and 80 grams of maleic acid were added and allowed to mix well. Eight grams of ditertiary butyl peroxide were added dropwise over a period of 30 minutes. A yellow color began to develop immediately after addition of the peroxide. However, after about half of the peroxide had been added, the viscosity of the polyethylene increased to where it was difficult to stir. Continued addition of peroxide caused the product to completely gel before all of the peroxide could be added.

This example shows the problems encountered when grafting maleic acid or maleic anhydride onto low molecular weight polyethylene such as a degraded polyethylene having a density of about 0.918, a ring and ball softening point of about 106°C., and a viscosity at 125°C. of about 250 centipoise. First, if peroxide is used as a catalyst (necessary when grafting temperatures of lower than about 225°C. are used) severe crosslinking and gelling occur. If peroxide is not used, then higher temperatures (greater than 225°C., preferably about 300°C.) are necessary to obtain enough grafting to produce an emulsifiable wax. However, the emulsifiable waxes have extremely poor color, ranging from red-brown to black. This color in part results because reaction is being carried out at 100°C. above the decomposition point of maleic anhydride. (Maleic anhydride decomposes at 200°C.)

Therefore, maleic acid and maleic anhydride are not suitable monomers for grafting onto polyethylene to make emulsifiable waxes with good melt color, amine color, and excellent viscosity stability. This is shown in the following example.

EXAMPLE 9

Four hundred grams of a degraded polyethylene having a density of about 0.918, a ring and ball softening point of about 106°C., and a viscosity at 125°C. of about 250 centipoise were melted in a glass resin pot under nitrogen. The polyethylene was raised to a temperature of 300°C. and 60 grams of maleic anhydride were added in 5 gram portions every five minutes for an hour. Vigorous stirring was used. After all of the maleic anhydride had been added, stirring was continued for 15 minutes, then all unreacted anhydride was removed by sweeping with nitrogen. The acid number of the product was 28 and it was emulsifiable. However, the color was a gray-black.

The modified low molecular weight polyethylene compositions of this invention are useful for many purposes including laminating aluminum foil to kraft paper, hot melt adhesives such as for use in sealing cartons or packaging frozen foods, as modifiers to improve the adhesion properties of petroleum waxes, and as aqueous emulsions for use as textile-treating agents or as floor polishes.

The invention has been described in considerable detail with particular reference to preferred embodiments thereof, but it will be understood that variations and modifications can be effected within the spirit and scope of the invention.

I claim:

1. An emulsifiable polyethylene wax having an acid number of at least 6 prepared by reacting a thermally degraded polyethylene having a melt viscosity of 225 to 15,000 centipoise at 125°C. with crotonic acid in the presence of an organic peroxide.

2. An emulsifiable polyethylene wax according to claim 1 wherein said acid number is 7 to 55.

3. An emulsifiable polyethylene wax according to claim 1 wherein said polyethylene has a density of from about 0.910 to about 0.980.

4. An emulsifiable polyethylene wax according to claim 3 wherein said peroxide is a member of the group consisting of ditertiary butyl peroxide, dicumyl peroxide or t-butylperoxypivalate.

5. An emulsifiable polyethylene wax according to claim 4 wherein the reaction of said polyethylene and said crotonic acid is carried out at a temperature of 120°C. to 300°C.

6. An emulsifiable polyethylene wax according to claim 5 wherein said polyethylene has a melt viscosity of from 225 to 10,000 centipoise at 125°C.

7. An emulsifiable polyethylene wax according to claim 6 wherein the reaction of said polyethylene and said crotonic acid is carried out at a temperature of 150° to 180°C.

8. An emulsifiable polyethylene wax according to claim 7 wherein said acid number is 20 to 40.

* * * * *